United States Patent
Be'ery et al.

(10) Patent No.: US 12,192,326 B2
(45) Date of Patent: Jan. 7, 2025

(54) SYSTEM AND METHOD OF MULTI-PARTY COMPUTATION BASED MULTI-FACTOR AUTHENTICATION

(71) Applicant: ZENGO LTD, Tel Aviv (IL)

(72) Inventors: Tal Arieh Be'ery, Petach Tikva (IL); Ouriel Ohayon, Tel Aviv (IL); Omer Shlomovits, Petach Tikva (IL); Gary Benattar, Netanya (IL); Alexander Manuskin, Gesher (IL); Oded Leiba, Glvataim (IL)

(73) Assignee: ZENGO LTD, Tel Aviv (IL)

(*) Notice: Subject to any disclaimer, the term of this patent is extended or adjusted under 35 U.S.C. 154(b) by 0 days.

(21) Appl. No.: 18/200,907

(22) Filed: May 23, 2023

(65) Prior Publication Data
US 2023/0299942 A1    Sep. 21, 2023

Related U.S. Application Data

(63) Continuation of application No. PCT/IL2021/051391, filed on Nov. 23, 2021.
(Continued)

(51) Int. Cl.
*H04L 9/08* (2006.01)
*H04L 9/32* (2006.01)

(52) U.S. Cl.
CPC .......... *H04L 9/0822* (2013.01); *H04L 9/0825* (2013.01); *H04L 9/3247* (2013.01)

(58) Field of Classification Search
None
See application file for complete search history.

(56) References Cited

U.S. PATENT DOCUMENTS

2016/0294562 A1* 10/2016 Oberheide ............ H04L 9/0863
2017/0220815 A1* 8/2017 Ansari .................. G06Q 20/36
(Continued)

FOREIGN PATENT DOCUMENTS

WO    WO/2020053851    3/2020

OTHER PUBLICATIONS

Sahu, A.K., Sharma, S. and Puthal, D., 2021. Lightweight multi-party authentication and key agreement protocol in iot-based e-healthcare service. ACM Transactions on Multimedia Computing, Communications, and Applications (TOMM), 17(2s), pp. 1-20. (Year: 2021).*
(Continued)

*Primary Examiner* — Luu T Pham
*Assistant Examiner* — Edward X Long
(74) *Attorney, Agent, or Firm* — PEARL COHEN ZEDEK LATZER BARATZ LLP

(57) ABSTRACT

Systems and methods of performing multi factor authentication (MFA), including: receiving, by a computing device, an MFA request from a first server, generating, by the computing device, a first share of a cryptographic key, based on a multi-party computation (MPC) protocol, generating, by a second server, a corresponding second share of the cryptographic key, based on the MPC protocol, wherein the cryptographic key corresponds to a public key and private key pair, co-signing, by the computing device and the second server, the MFA request based on the MPC protocol, wherein the computing device signs the MFA request with the first share and the second server signs the MFA request with the second share, and verifying, by the first server, the signed MFA request.

14 Claims, 4 Drawing Sheets

Related U.S. Application Data

(60) Provisional application No. 63/116,930, filed on Nov. 23, 2020.

(56) References Cited

U.S. PATENT DOCUMENTS

| | | |
|---|---|---|
| 2020/0044862 A1 | 2/2020 | Yadlin et al. |
| 2020/0044863 A1* | 2/2020 | Yadlin .................. G06F 9/54 |
| 2020/0169410 A1 | 5/2020 | Wainblat et al. |
| 2020/0252382 A1 | 8/2020 | Peddada, IV et al. |

OTHER PUBLICATIONS

Helminger, L., Kales, D., Ramacher, S. and Walch, R., 2021, May. Multi-party revocation in sovrin: Performance through distributed trust. In Cryptographers' Track at the RSA Conference (pp. 527-551). Cham: Springer International Publishing. (Year: 2021).*

D. W. Archer et al. "From Keys to Databases—Real-World Applications of Secure Multi-Party Computation", The Computer Journal, vol. 61, No. 12, Sep. 12, 2018.

* cited by examiner

SYSTEM AND METHOD OF MULTI-PARTY COMPUTATION BASED MULTI-FACTOR AUTHENTICATION

CROSS-REFERENCE TO RELATED APPLICATIONS

This application is a National Phase Application of PCT International Application No. PCT/IL2021/051391, International Filing Date Nov. 23, 2021, claiming the benefit of U.S. Provisional Patent Application No. 63/116,930, filed Nov. 23, 2020, which are hereby incorporated by reference.

FIELD OF THE INVENTION

The present invention relates to blockchain based computer networks. More particularly, the present invention relates to systems and methods for multi-party computation (MPC) based multi-factor authentication (MFA).

BACKGROUND OF THE INVENTION

As digital services become widely available, for instance due to technological advances, there is an increasing need for user authentication. For example, when logging in (with user's secret, such as a password) to an email service, an online bank account service, etc. Usually, the Multi Factor Authentication (MFA) and Universal $2^{nd}$ Factor (U2F) methods are used.

Multi-factor authentication (MFA) is an authentication method in which a computer user is granted access only after successfully presenting two or more pieces of evidence (or factors) to an authentication mechanism knowledge (something the user and only the user knows), possession (something the user and only the user has), and inherence (something the user and only the user is.

Universal $2^{nd}$ Factor (U2F) is an open standard that strengthens and simplifies Two-Factor Authentication (2FA) using specialized Universal Serial Bus (USB), near-field communication (NFC) devices, Bluetooth devices and others. Typically, U2F and similar solutions, store a secret, either in hardware or software. Using that secret, these products can cryptographically generate outputs (by signing challenges) proving the authenticator's ownership of the secret and therefore of the device.

Users can purchase hardware devices that can be more secure against the theft of their secret, but can cost more, may need to be physically shipped and can be vulnerable to physical theft, loss and/or damage. Alternatively, users can choose software U2F products as they may be cheaper or even free, can be downloaded immediately and can be resilient to loss via backup, however they can be much more susceptible to hackers carrying out cyber-attacks to steal the user's secret.

Technically, U2F methods are similar to cryptographic technology. A key pair (public and private key) can be generated by the client, where the private key can be stored by the client and the public key can be registered with the service provider. To authenticate, the service provider can send a challenge (e.g., a string of bytes) to the client and the client can sign the challenge with its private key and sends the signature back to the service. The service can then cryptographically verify that the message was indeed signed by the client by, for example, using the client's pre-registered public key.

In typical classic blockchain software implementations, a client locally generates a private key and a corresponding public key. The public key can be used to create an address and/or the messages to be signed may be transactions of value between such addresses (or accounts). Verification of transaction validity may be done publicly by the blockchain maintainers using the relevant addresses' public keys, while the key generation may be done locally using the client's secret key. It should be noted that the local data is not public, and therefore key generation carried out locally may not be accessible by other parties as with public key generation. In order to achieve a distributed signing for blockchain algorithms, it may be required to change the key generation algorithm (i.e., generating a private-public keypair) and/or signing protocols without affecting the public verification protocol. This may be achieved for instance by validating a signature on a message using the public key.

Distributed key generation protocols may involve two main parts: a local secret data being generated (similar to the original centralized key generation protocol) by each of the parties, and communication between the participating parties to provide the necessary view to all other parties to compute the composed public key (and resulting address), and to later generate the signatures. Distributed signing occurs only after the key generation and usually involves an interactive protocol for each party: receiving a message to sign and applying local computation on the message using local data previously generated on the key generation protocol to distribute the results and compute a signature locally. Splitting of the signing functionality (such that several parties are involved in each signature) may be currently considered as best practice for security and is implemented in some of the blockchain networks, as the "multi-signature" extension, in which multiple signers are explicitly assigned with multiple distinct keys by a dedicated signature algorithm.

The security of MFA depends on the security of its private key, used to cryptographically prove user possession of the secret. Most MFA solutions store the key on customer's device. Therefore, when they are compromised a cyber-theft is possible.

SUMMARY

There is thus provided, in accordance with some embodiments of the invention, a method of performing multi factor authentication (MFA), the method including: receiving, by a computing device, an MFA request from a first server, generating, by the computing device, a first share of a cryptographic key, based on a multi-party computation (MPC) protocol, generating, by a second server, a corresponding second share of the cryptographic key, based on the MPC protocol, wherein the cryptographic key corresponds to a public key and private key pair, co-signing, by the computing device and the second server, the MFA request based on the MPC protocol, wherein the computing device signs the MFA request with the first share and the second server signs the MFA request with the second share, and verifying, by the first server, the signed MFA request.

In some embodiments, the first share and second share, of the cryptographic key, are generated separately based on a distributed Key Generation protocol. In some embodiments, the signed MFA request is sent, by the computing device, to the first server. In some embodiments, the signed MFA request is sent, by the second server, to the first server.

In some embodiments, the first share of the cryptographic key is encrypted, by the computing device, with a recovery public key, the encrypted first share of the cryptographic key is sent, by the computing device, to the second server, the computing device is detected as unavailable, the recovery private key is retrieved by the second server, and the encrypted first share of the cryptographic key is decrypted by the second server.

In some embodiments, the second share of the cryptographic key is encrypted, by the second server, with a recovery public key, the encrypted second share of the cryptographic key is sent, by the second server, to the computing device, the second server is detected as unavailable, the recovery private key is retrieved by the computing device, and the encrypted second share of the cryptographic key is decrypted by the computing device.

In some embodiments, at least a share of a cryptographic key is verified, wherein the verifying includes: encrypting, by the computing device, at least a share of the cryptographic key with the public key, sending, by the computing device, the encrypted at least a share of the cryptographic key to the second server, retrieving, by the second server, the public key from the computing device, and verifying, by the second server, that the encrypted at least a share of the cryptographic key is compatible to be decrypted by the private key, based on the retrieved public key and the corresponding public key of the at least a share of the cryptographic key.

In some embodiments, a signing policy is enforced, by the second server, when signing by the computing device. In some embodiments, the signing policy is based on additional data, such as at least one of: time of signing, location of signing, and party that performs the signing. In some embodiments, the computing device is registered with the first server by sharing the public key with the first server. In some embodiments, the first server is coupled to at least one blockchain based computer network, and wherein the computing device is configured to register together with the second server at least one transaction on the at least one blockchain based computer network. In some embodiments, a key rotation protocol is applied on at least one of the first share and the second share of the cryptographic key, for each new MFA request.

In some embodiments, a group ID is generated for a group of users of a shared MFA account, the group ID and the first share is received, by the second server, from the computing device, the first share is distributed, by the second server, among each of the users of the group, and a signing logic scheme is enforced for users of the group when signing with the shared MFA account.

There is thus provided, in accordance with some embodiments of the invention, a system for multi factor authentication (MFA), the system including: a computing device, wherein the computing device is configured to: receive an MFA request from a first server, generate a first share of a cryptographic key, based on a multi-party computation (MPC) protocol, and co-sign the MFA request with the first share based on the MPC protocol, and a second server, in communication with the computing device, wherein the second server is configured to: generate a corresponding second share of the cryptographic key, based on the MPC protocol, wherein the cryptographic key corresponds to a public key and private key pair, and co-sign the MFA request with the second share based on the MPC protocol, and wherein the signed MFA request is configured to be verified by the first server.

In some embodiments, the first share and second share, of the cryptographic key, are generated separately based on a distributed Key Generation protocol. In some embodiments, the computing device is configured to: encrypt the first share of the cryptographic key with a recovery public key, send the encrypted first share of the cryptographic key to the second server, and wherein the second server is further configured to: detect that the computing device is unavailable, and decrypt the encrypted first share of the cryptographic key.

In some embodiments, the second server is configured to: encrypt the second share of the cryptographic key with a recovery public key, send the encrypted second share of the cryptographic key to the computing device, and wherein the computing device is further configured to: detect that the second server is unavailable, retrieve the recovery private key, and decrypt the encrypted second share of the cryptographic key.

In some embodiments, the computing device is further configured to verify at least a share of a cryptographic key, wherein the verifying includes: encrypting, by the computing device, at least a share of the cryptographic key with the public key, sending, by the computing device, the encrypted at least a share of the cryptographic key to the second server, retrieving, by the second server, the public key from the computing device, and verifying, by the second server, that the encrypted at least a share of the cryptographic key is compatible to be decrypted by the private key, based on the retrieved public key and the corresponding public key of the at least a share of the cryptographic key.

In some embodiments, the second server is further configured to enforce a signing policy when signing by the computing device. In some embodiments, the signing policy is based on at least one of: time of signing, location of signing, and party that performs the signing. In some embodiments, the computing device is configured to register with the first server by sharing the public key with the first server. In some embodiments, the first server is coupled to at least one blockchain based computer network, and wherein the computing device is configured to register together with the second server at least one transaction on the at least one blockchain based computer network.

In some embodiments, a key rotation protocol is applied on at least one of the first share and the second share of the cryptographic key, for each new MFA request. In some embodiments, the second server is configured to: generate a group ID for a group of users of a shared MFA account, receive the group ID and the first share from the computing device, distribute the first share among each of the users of the group, and enforce a signing logic scheme for users of the group when signing with the shared MFA account.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Figure 1:
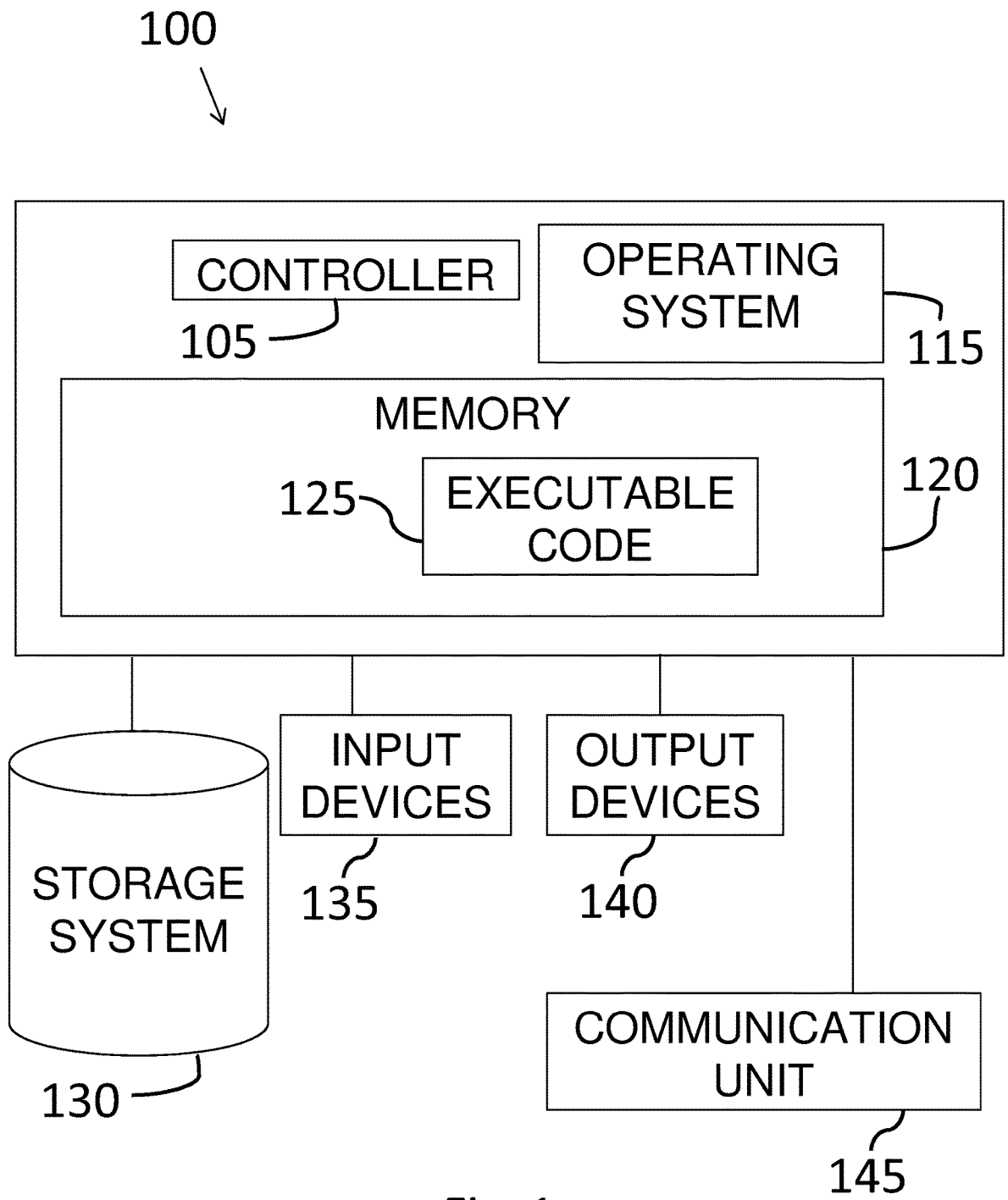
FIG. 1 shows a block diagram of an exemplary computing device, according to some embodiments of the invention.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device (s) 100, for example, to act as the various devices or the components shown in FIG. 2. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, the security risks and/or usability issues and/or tradeoffs in 2FA may be regarded as similar (or even identical) to corresponding issues in blockchain technology (e.g., with cryptocurrencies). Accordingly, cryptographic methods such as multi-party computation applied to blockchain based networks, may also be utilized for 2FA use cases, thereby allowing 2FA users to experience the same features. For example, distributed key generation and signing may be utilized for 2FA. The distributed key generation may include two parts: generating a local secret data (similar to the original centralized or non-distributed key generation protocol) by each of the parties, and communication between the participating parties to provide the overall view to all other parties so as to compute the composed public key (and resulting address) and later generate signatures. The communication step may include several rounds of communications between the parties, for instance with a broadcast channel as well as private channels.

According to some embodiments, systems and methods are provided for applying a secure Multi-Party Computation (MPC) to create an MFA solution, that is compatible with the U2F standard in a client-server architecture. Using MPC based solution for MFA may be carried out without changes to the authenticating server as it is unaware of MPC-U2F implementations. Thus, the MFA users may experience all the benefits and comfort of a server-based solution without compromising their security.

In some embodiments, a distributed key generation MPC protocol may be used based on at least one of an Elliptic Curve Digital Signature Algorithm (ECDSA), Edwards-Curve Digital Signature Algorithm (EdDSA) and a Schnorr signature algorithm. It should be appreciated that other MPC and signing protocols may be used as well. In some embodiments, the MPC shares may be applied with threshold signatures addresses, where a threshold cryptosystem protects its private key by creating encrypted shares in a distributed manner among a plurality of computers, as explained herein. In order to sign a message, several parties (more than a predefined signing parties threshold number) may cooperate in the signature protocol with corresponding signing, such as in the MPC protocol. In a threshold cryptosystem, at least one threshold signature address (e.g., one address for each party) with corresponding cryptographic protocol for distributed key generation and signing may be assigned, where the number of such addresses may be greater than a predefined signature addresses threshold number.

Figure 2:
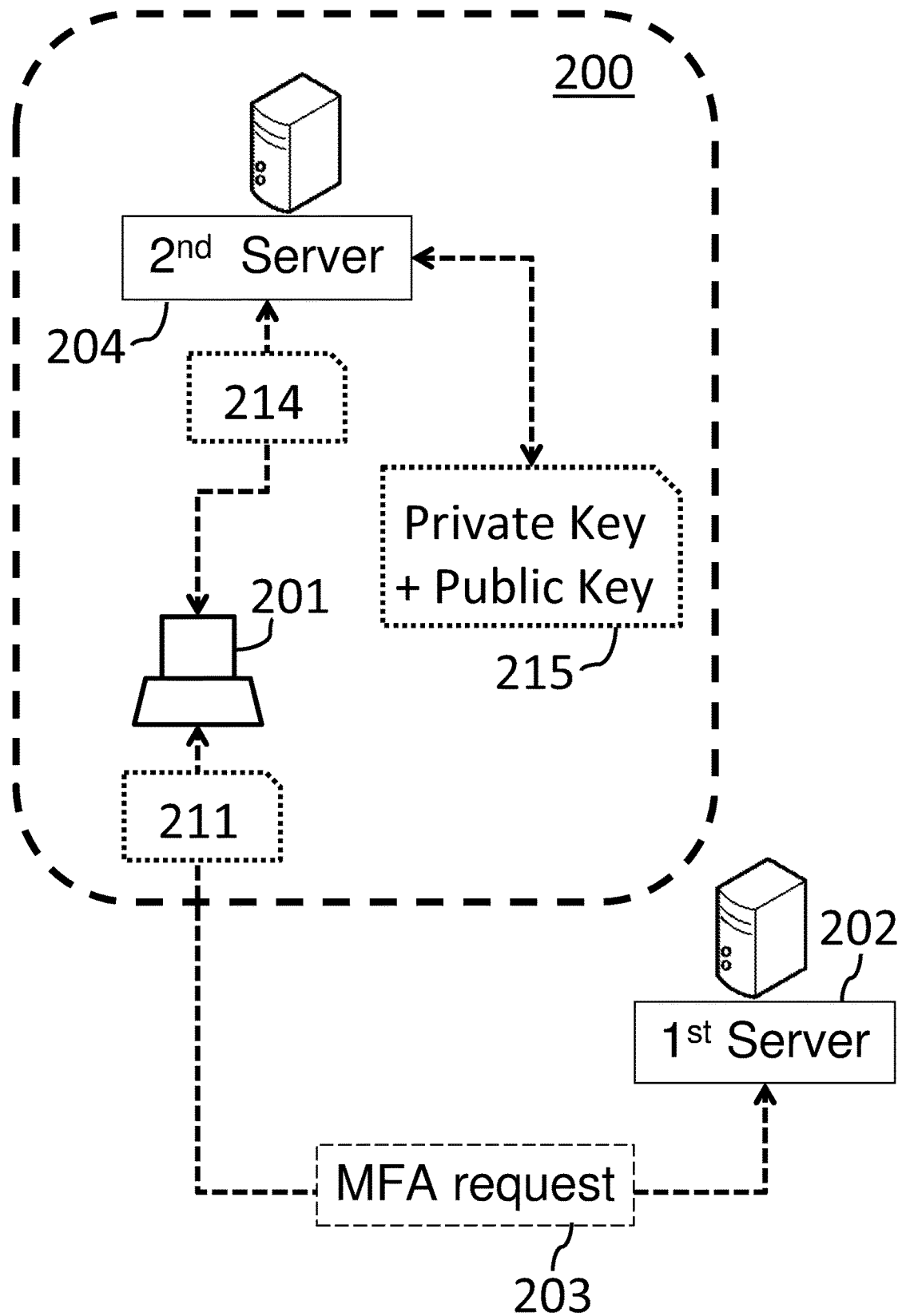
FIG. 2 show block diagrams of a system for multi-factor authentication (MFA), according to some embodiments of the invention.

Reference is now made to FIG. 2, which shows block a diagram of an MFA system 200, according to some embodiments. The MFA system may utilize MPC in a client-server environment to achieve the MFA. In FIG. 2, hardware elements are indicated with a solid line and the direction of arrows may indicate the direction of information flow.

In some embodiments, the MFA system 200 includes a computing device 201 (e.g., such as computing device 100 shown in FIG. 1) that is configured to connect to a first server 202 (e.g., via the Internet or with at least partial wireless communication). For example, if a user of the computing device 201 may browse a website that requires U2F login, a dedicated MFA program may be invoked at the computing device 201 via the browser support of U2f (e.g., via Bluetooth). The website's challenge may be sent to the MFA program over the U2F protocol, such that the computing device 201 and corresponding MFA servers may jointly sign the challenge and send it back to the browser so as to relay it to the website for verification. The computing device 201 may be a mobile device such as smartphone, tablet, laptop, etc. that is connected to the Internet, and uses a web browser to access a particular website on the first server 202. In order to login to that website (or another service by the first server 202), the first server 202 may issue a multi-factor authentication (MFA) request 203 to the computing device 201, that is compatible with the U2F standard.

In some embodiments, the computing device 201 is configured to generate a first share 211 of a cryptographic key 215, based on a multi-party computation (MPC) protocol. For example, the MPC based first share 211 of a cryptographic key 215 may be utilized for multi-factor authentication with the first server 202.

In some embodiments, the MFA system 200 includes a second server 204 (e.g., unrecognizable to the first server 202), that is in communication with the computing device 201. The second server 204 may be configured to generate a corresponding second share 214 of the cryptographic key 215, based on the MPC protocol. The shares of the cryptographic key 215 may for instance correspond to a public key and private key pair. The two shares 211, 214 may be generated separately as a result of a distributed Key Generation protocol, to generate a private-public keypair. For example, the Key Generation protocol may generate a one-time keypair and allow to generate multiple signatures at a later time.

It should be noted that in previous MFA solutions, the client locally generates a private key and a corresponding public key. This public key is used for public identity registration and the messages to be signed are U2F service generated challenges. The verification of the signed messages is done by an authenticating server using the relevant public keys, while key generation and signing are done locally using the client secret key. In order to achieve a distributed signing for MFA software, the first two functions of key generation and signing may be modified based on the MPC protocol, without affecting the third public verification protocol.

In some embodiments, the shares of the cryptographic key 215 are generated based on MPC in order to allow MFA authentication such that multiple services may be supported without jeopardizing the secret key. For example, the shares 211, 214 may be rotated such that there is no need to change the effective private key and corresponding public key, as further described hereinafter.

According to some embodiments, the computing device 201 and the second server 204 are configured to co-sign the MFA request 203 with the first share 211 and the second share 214 respectively, based on the MPC protocol. For example, the computing device 201 may co-sign the MFA request 203 with the first share 211 and then send the signed MFA request to the second server 204 to co-sign with the second share 214. In another example, the second server 204 may co-sign the MFA request 203 with the second share 214 and then send the signed MFA request to the computing device 201 to co-sign with the first share 211. In some embodiments, the MFA request 203 may be co-signed simultaneously by the computing device 201 with the first share 211, and by the second server 204 with the second share 214.

In some embodiments, both shares 211, 214 are required to sign the U2F challenge of the MFA request 203. The signing protocol may also be distributed such that the first share 211 never leaves the computing device 201 that generated it. Similarly, the signing protocol may be distributed such that the second share 214 never leaves the second server 204 that generated it. In some embodiments, the MPC signed challenge (or signed MFA request 203) is indistinguishable from a regular signed challenge in U2F protocol. Thus, the MPC based signing may replace other MFA methods.

In some embodiments, the signed MFA request 203 is configured to be verified by the first server 202. For example, using standard verification of MFA using the composed public key that was created in a distributed manner. The verification protocol may be agnostic and unaware to the process that created that public key (and specifically not aware if it was created in a distributed manner).

Currently U2F uses an Elliptic Curve Digital Signature Algorithm (ECDSA). However, some embodiments may qualify to other signing algorithms should the U2F standard (or other standards) choose to support them. ECDSA example assuming that Alice has a private key 'x', the corresponding public key is x·G and Alice wants to sign a message 'm'. Alice may compute a signature on a message 'm' as follows: an ephemeral key 'k' is chosen, and R=k·G is computed. Assuming 'R' is the point(rx,ry), Then, set 'r' to be the 'x' coordinate of the curve point 'R'. The signature: s=k−1·(H(m)+r·x) are computed, where 'H' denotes a hash function Finally, resulting the output (r,s). For example, all commitments in the protocols are done using SHA256 protocol, however any other collision resistant cryptographic hash function may be used as well (e.g., SHA-3).

In some embodiments, the two parties that jointly compute the signature are a server and a client (e.g., the computing device 201 and the second server 204). The server (e.g., the second server 204) may have access to more computing resources and may take the role in the protocols of the party that requires more computing power.

According to some embodiments, a Hierarchical Deterministic (HD) property is applied to the MPC based MFA system 200, for instance to allow access to multiple different services based on the same core secret without jeopardizing its confidentiality. The HD property may be applied hand-in-hand with the rotation property that allows the solution to change the different shares (e.g., first share 211 and second share 214) while maintaining the same equivalent private and public key pair.

Some cryptographic protocols (e.g., Bitcoin's BIP32) define a method for child key derivation from a parent key. This method is extended using indices and tree structure to create infinite number of public-private key pairs from one master key. Using an agreed hierarchical system (e.g., as in the BIP44 protocol) may enable the creation of HD set of elliptic curve key pairs. The HD property may be used for a variety of use cases such as generating change addresses or assigning one master key for different cryptocurrencies. In some embodiments, a two party key generation algorithm may apply the HD concept to the MPC server-client setting, such that the computing device 201 holds a first share 211 of the secret key 215 and the second server 204 holds the second share 214. Together and without revealing each other's share of the secret key, the server and client may co-sign (e.g., co-sign the MFA request 203) together. The two-party key generation scheme (TPKG) assumes both parties know the encryption public parameters (e.g., with base point 'G' of the secp256r1 elliptic curve for ECDSA) and all the rest of this elliptic curve parameters. In some embodiments, new keys may be derived whenever there is need (e.g., with a new address for transaction, or for a new type of cryptocurrency), each of the parties may independently (or non-interactively) derive its next key based on previous key, by advancing the index variable and performing the following algorithm.

For the key rotation property, the private key and public key are kept the same, but the private key shares are changed. The advantage of this property is significantly reducing the time window for the attacker to get both keys. Using key rotation, attackers have to get both key shares before a KeyRotate operation, compared to the indefinite time until the user moves its assets to another address. Furthermore, the rotation is not evident on public ledgers (e.g., on the blockchain) such that it's very fast and may not incur any fees compared to some commercially available blockchains. When KeyRotate is applied, if the attackers have one share before a key rotation and the other after the rotation, they may not be able to recover the private key. Likewise, if the attackers have numerus rotated shared keys of either party (client or server), they cannot get one of the shares of the other party for one of these specific rotations.

In some embodiments, the HD and key rotation algorithms may co-exist in harmonious manner and they may be applied and change either private and/or public key (for HD), or the client and server shares (for key rotation) with no impact to the other algorithm. Since both HD-tree and key rotation protocols are multiplicative, the result may be the property of commutativity modulo the field order between them: Rot(HD(MK))=HD(Rot(MK)).

In some embodiments, the second server 204 is integrated with at least one third party service, for instance to support threat intelligence services that can flag suspicious IP addresses.

According to some embodiments, at least one of the computing device 201 and the second server 204 is connected to a backup service (e.g., a dedicated cloud based backup service) in order to perform recovery of secrets in the case they are lost either by the computing device 201 or by the second server 204, without compromising the security aspects of separating the secrets. For the recovery property, the splitting of the signature responsibility between the computing device 201 (or the client) and the second server 204 may eliminate the single point of failure confidentiality problems associated with an atomic private key. In case either the computing device 201 or the second server 204 becomes unavailable, a recovery process may be carried out.

In some embodiments, recovery is carried out through Know Your Customer (KYC) authentication. For recovery at the client side, on boarding may include authentication data created by the computing device 201 (or client) on the second server 204 side. Using a third-party KYC service, the client may validate its identity, and the server gets real world verified details (e.g., name, date of birth, address, faces, etc.). The Client may generate a key pair with a randomized passphrase to protect the private key and send a certificate signing request (CSR) to the server to create a transport layer security (TLS) certificate. The second server 204 may send the TLS Certificate to the computing device 201, and the client may send the certificate with an encrypted private key to the second server 204 for storage. The computing device 201 may store the passphrase (e.g., serving as a recovery secret) in plaintext on cloud storage and may "forget" the passphrase.

In another example, authentication and recovery may be carried out when the client has lost its computing device and wants to recover its account. The client may provide a username, and the second server 204 may accordingly present an alternative authentication option using KYC. The client may recover the passphrase from a cloud storage, and/or the client may authenticate to the server using the relevant authentication method (e.g., providing KYC details through a third party service). If authentication is successful (e.g., if the KYC details are verified) and matching the details established on the on-boarding phase then the server may send to the client: relevant client key share encrypted version, a certificate with encrypted private key. The client may decrypt the encrypted private key and regenerates its key pair, and using the private key the client may decrypt the encrypted client share to regain control of its assets. In some embodiments, an MFA may be considered as an asset.

For recovery at the server side, the client may be provided with an encrypted version of the second server's second share 214, which corresponds to the client' first share 211. The server's second share 214 may be encrypted with a public key (e.g., a dedicated server recovery public key). The client may accordingly be able to verify that indeed the encrypted server's second share 214 matches the first share 211, using the share public verifiability property. In some embodiments, the server recovery private key is stored at a party that is external to the server recovery party. When the recovery party decides that the MFA second server 204 is unavailable, it may release the server recovery private key. Thus, it may be possible to decrypt the server's recovery share and recreate the private keys and export them as hexagonal strings and/or mnemonics that can be imported into other programs.

According to some embodiments, having a dedicated MFA second server 204 that is part of the critical chain of authentication can allow administrators to enforce elaborated policies that are not possible in cases in which the second factor is only held by the end user. Such policies can limit the use of the MFA to certain contexts, for example, only allow it from office IP range, or business hours. In some embodiments, a group of users may have a shared account for the same key, such that all of the users in the group utilize the same MFA service, such that a signing policy may be applied for signing logic by the group members. The approved logic may be that all group members are required to approve a U2F authentication, or any of them or any sub-groups in any order (e.g., one user and one manager). Specifically, the life cycle of the group may be managed for: creation, adding and removing members, defining and modifying the control logic etc.

Splitting the control over the key shares, may allow it to be shared by a group to allow customs control logic, for instance each member of group is allowed access, all group members are required to approve access, 'K' out of 'N' group members are required to approve access. This may be advantageous for cases in which the service does not support a group account, but it actually needs to be used by multiple users.

In some embodiments, a new shared account may be created by the user of the first computing device 201, in communication with a blockchain network. For example, the user of the first computing device 201 may use a dedicated user interface (e.g., within a dedicated mobile application) to create a new shared account and accordingly become the administrator of that account. The first computing device 201 and the second server 204 may be in communication with the blockchain network, such that in order to make the newly created account in the blockchain network to be a shared account, the second server 204 may be required to hold a corresponding cryptographic key. Once the shared account is created, a threshold signature scheme (TSS) key generation protocol and/or the MPC protocol may be utilized to split a cryptographic key, into a plurality of shares, for the first computing device 201 and the second server 204. For example, the cryptographic key corresponding to the created shared account may be split into a first share for the first computing device 201 and a second share for the second server 204. According to some embodiments, the system 200 may manage various actions for the shared account, by carrying out at least one of the following actions: creation, sharing, sending transactions, modification, recovery and deletion.

In some embodiments, the shared account may be shared with other users when the user of the first computing device 201 (e.g., the administrator of the shared account) defines at least one additional second user of another computing device to share the account, for instance selecting users for the group. The user of the first computing device 201 may also define a signing logic and/or order scheme. In some embodiments, the signing logic may be arbitrary, for instance not related to the blockchain network (e.g., depending on external parameters such as time, date and/or weather, for example depending on parameters not related to blockchain technology such as rainy weather or national holiday).

The usage can also be monitored in real time for auditing purposes and/or for normal usage pattern learning to cater for anomaly detection (e.g., a user connects from a new device on different hours on a different location). If a suspicious behavior is detected, either via anomaly or via predefined rules (e.g., a rule stating that using IP addresses from country 'X' is not allowed) and the server may block it.

According to some embodiments, the system 200 may be applied to a blockchain based computer network. For example, the second server 204 may be associated with at least one blockchain based computer network. Using MPC based MFA within the same architecture of blockchain networks (e.g., with a dedicated cryptocurrency wallet) to login to a blockchain related service (for example in a cryptocurrency exchange) may allow the user to enjoy the synergism of having his computing device bound to the blockchain service. In some embodiments, using MPC based MFA within the same architecture of cryptocurrency wallet allows it be considered as a "digital asset". For example, to login and immediately within the same architecture of cryptocurrency wallet associate the account to the wallet. One use case enabled by this feature, is that users can exchange their access (u2f private key) for crypto assets by exchanging the keys. This may be done safely, by leveraging the atomic swap feature. For example, a user may safely sell their gaming account to another user in exchange for $100 in cryptocurrency.

In some embodiments, having 2FA solution residing within a cryptocurrency wallet may allow the product to offer its users to tie their cryptocurrency services using 2FA (e.g., for exchanges) to the wallet so as to manage them together. For example, when a group member is added or removed from the shared account, its rights to use related services (e.g., exchanges) may be automatically and implicitly updated.

Figure 3A:
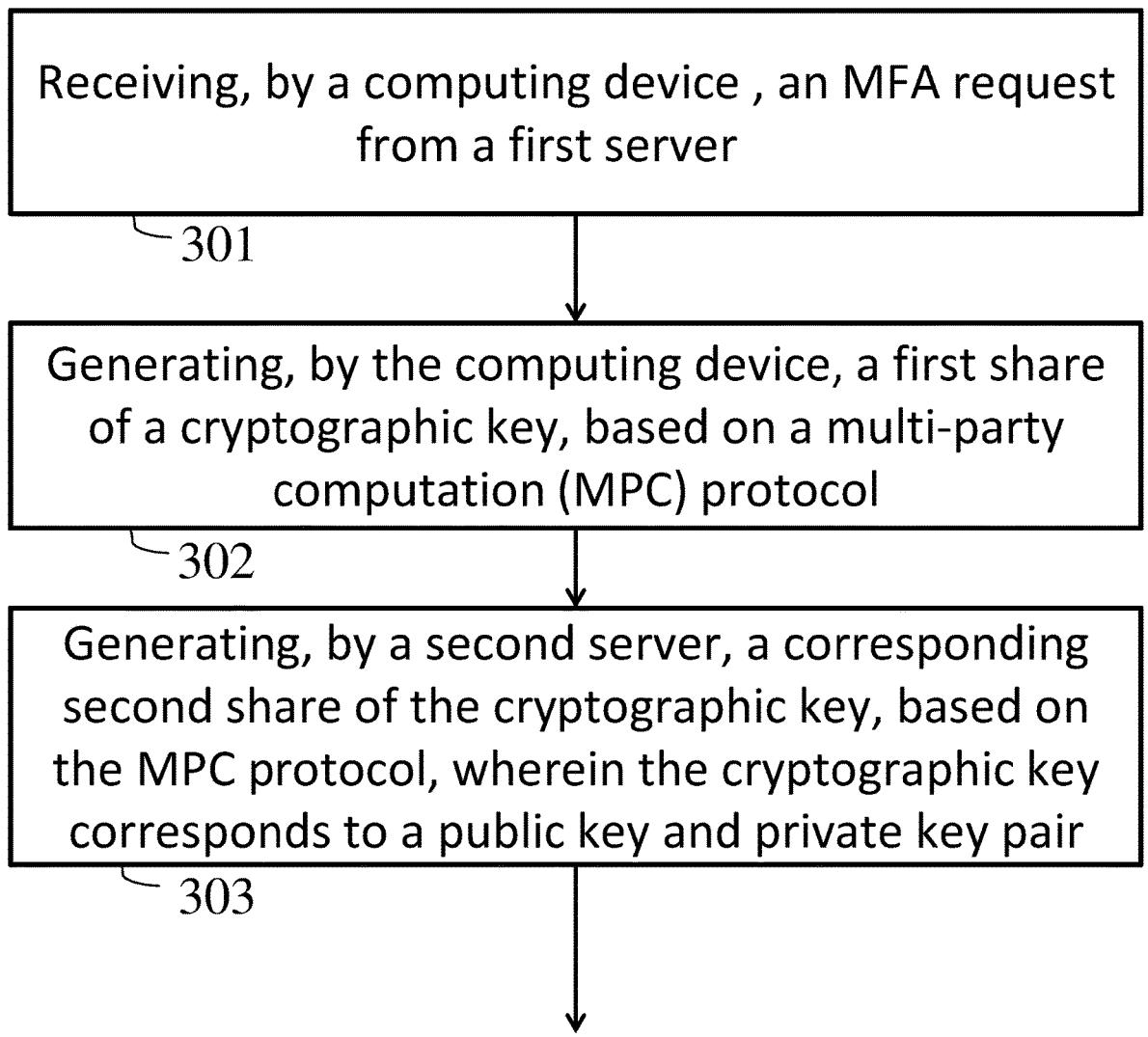
FIGS. 3A-3B show a flowchart of a method of performing multi factor authentication (MFA), according to some embodiments of the invention.
Figure 3B:
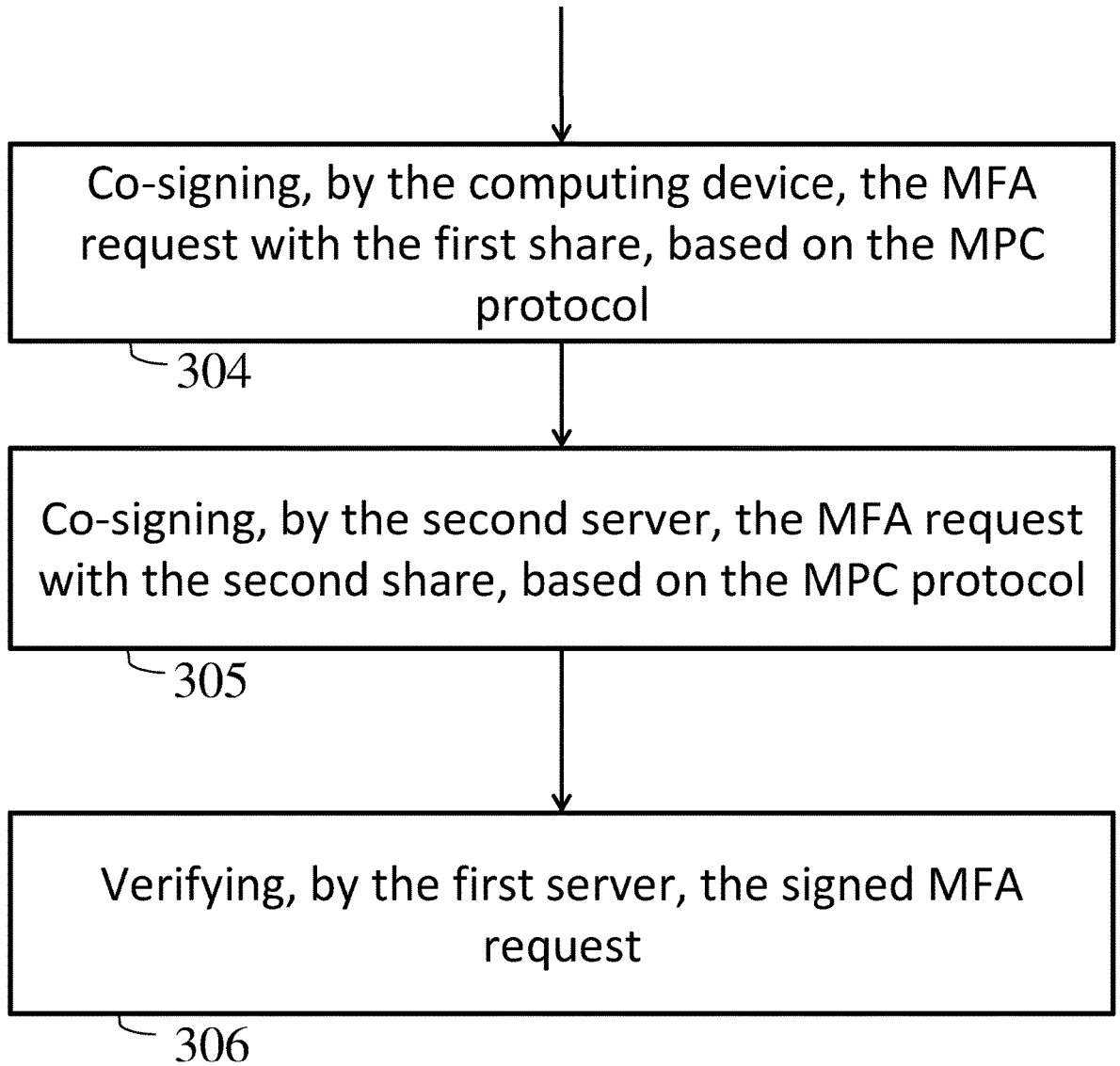

Reference is now made to FIGS. 3A-3B, which shows a flowchart of a method of performing multi factor authentication (MFA), according to some embodiments.

In Step 301, an MFA request may be received (e.g., by the computing device) from a first server. In Step 302, a first share of a cryptographic key may be generated (e.g., by the computing device), based on an MPC protocol. In Step 303, a corresponding second share of the cryptographic key may be generated (e.g., by the second server), based on the MPC protocol, wherein the cryptographic key corresponds to a public key and private key. In Step 304, the MFA request may be co-signed with the first share (e.g., by the computing device), based on the MPC protocol. In Step 305, the MFA request may be co-signed with the second share, (e.g., by the second server), based on the MPC protocol. In Step 306, the signed MFA request may be verified (e.g., by the first server).

According to some embodiments, any number of computing devices and/or computer networks may similarly apply, where each additional computing devices and/or additional computer networks may add another portion to be shared for each cryptographic key.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of performing multi factor authentication (MFA), the method comprising:
   receiving, by a computing device, an MFA request from a first server;
   generating, by the computing device, a first share of a cryptographic key, based on a multi-party computation (MPC) protocol;
   generating, by a second server, a corresponding second share of the cryptographic key, based on the MPC protocol, wherein the cryptographic key corresponds to a public key and private key pair;
   co-signing, by the computing device and the second server, the MFA request based on the MPC protocol, wherein the computing device signs the MFA request with the first share and the second server signs the MFA request with the second share;
   verifying, by the first server, the signed MFA request;
   encrypting, by the second server, the second share of the cryptographic key with a recovery public key;
   sending, by the second server, the encrypted second share of the cryptographic key to the computing device;
   detecting that the second server is unavailable;
   retrieving, by the computing device, the recovery private key;
   decrypting the encrypted second share of the cryptographic key by the computing device;
   generating a group ID for a group of users of a shared MFA account;
   receiving, by the second server, the group ID and the first share from the computing device;
   distributing, by the second server, the first share among each of the users of the group;
   enforcing a signing logic scheme for users of the group when signing with the shared MFA account; and
   registering the computing device with the first server by sharing the public key with the first server.

2. The method of claim 1, further comprising:
   encrypting, by the computing device, the first share of the cryptographic key with a recovery public key;
   sending, by the computing device, the encrypted first share of the cryptographic key to the second server;
   detecting that the computing device is unavailable;
   retrieving, by the second server, the recovery private key; and
   decrypting the encrypted first share of the cryptographic key by the second server.

3. The method of claim 1, further comprising verifying at least a share of a cryptographic key, wherein the verifying comprises:
   encrypting, by the computing device, at least a share of the cryptographic key with the public key;
   sending, by the computing device, the encrypted at least a share of the cryptographic key to the second server;
   retrieving, by the second server, the public key from the computing device; and
   verifying, by the second server, that the encrypted at least a share of the cryptographic key is compatible to be decrypted by the private key, based on the retrieved public key and the corresponding public key of the at least a share of the cryptographic key.

4. The method of claim 1, further comprising enforcing, by the second server, a signing policy when signing by the computing device.

5. The method of claim 4, wherein the signing policy is based on additional data, such as at least one of: time of signing, location of signing, and party that performs the signing.

6. The method of claim 1, wherein the first server is coupled to at least one blockchain based computer network, and wherein the computing device is configured to register together with the second server at least one transaction on the at least one blockchain based computer network.

7. The method of claim 1, further comprising applying a key rotation protocol on at least one of the first share and the second share of the cryptographic key, for each new MFA request.

8. A system for multi factor authentication (MFA), the system comprising:
   a computing device;
   wherein the computing device is configured to:
   receive an MFA request from a first server;

generate a first share of a cryptographic key, based on a multi-party computation (MPC) protocol; and
co-sign the MFA request with the first share based on the MPC protocol; and a second server, in communication with the computing device, wherein the second server is configured to:
generate a corresponding second share of the cryptographic key, based on the MPC protocol, wherein the cryptographic key corresponds to a public key and private key pair; and
co-sign the MFA request with the second share based on the MPC protocol, wherein the signed MFA request is configured to be verified by the first server;
encrypt the second share of the cryptographic key with a recovery public key;
send the encrypted second share of the cryptographic key to the computing device;
and wherein the computing device is further configured to:
detect that the second server is unavailable;
retrieve the recovery private key;
decrypt the encrypted second share of the cryptographic key;
generate a group ID for a group of users of a shared MFA account;
receive the group ID and the first share from the computing device;
distribute the first share among each of the users of the group;
enforce a signing logic scheme for users of the group when signing with the shared MFA account; and
register the computing device with the first server by sharing the public key with the first server.

9. The system of claim 8, wherein the computing device is further configured to:
encrypt the first share of the cryptographic key with a recovery public key;
send the encrypted first share of the cryptographic key to the second server;
and wherein the second server is further configured to:
detect that the computing device is unavailable; and
decrypt the encrypted first share of the cryptographic key.

10. The system of claim 8, wherein the computing device is further configured to verify at least a share of a cryptographic key, wherein the verifying comprises:
encrypting, by the computing device, at least a share of the cryptographic key with the public key;
sending, by the computing device, the encrypted at least a share of the cryptographic key to the second server;
retrieving, by the second server, the public key from the computing device; and
verifying, by the second server, that the encrypted at least a share of the cryptographic key is compatible to be decrypted by the private key, based on the retrieved public key and the corresponding public key of the at least a share of the cryptographic key.

11. The system of claim 8, wherein the second server is further configured to enforce a signing policy when signing by the computing device.

12. The system of claim 8, wherein the signing policy is based on at least one of:
time of signing, location of signing, and party that performs the signing.

13. The system of claim 8, wherein the first server is coupled to at least one blockchain based computer network, and wherein the computing device is configured to register together with the second server at least one transaction on the at least one blockchain based computer network.

14. The system of claim 8, wherein a key rotation protocol is applied on at least one of the first share and the second share of the cryptographic key, for each new MFA request.

* * * * *